Jan. 2, 1968   K. DUTTA ETAL   3,361,637
SHUTTER DEVICE FOR NUCLEAR REACTOR CORE
Filed Sept. 2, 1966   2 Sheets-Sheet 1
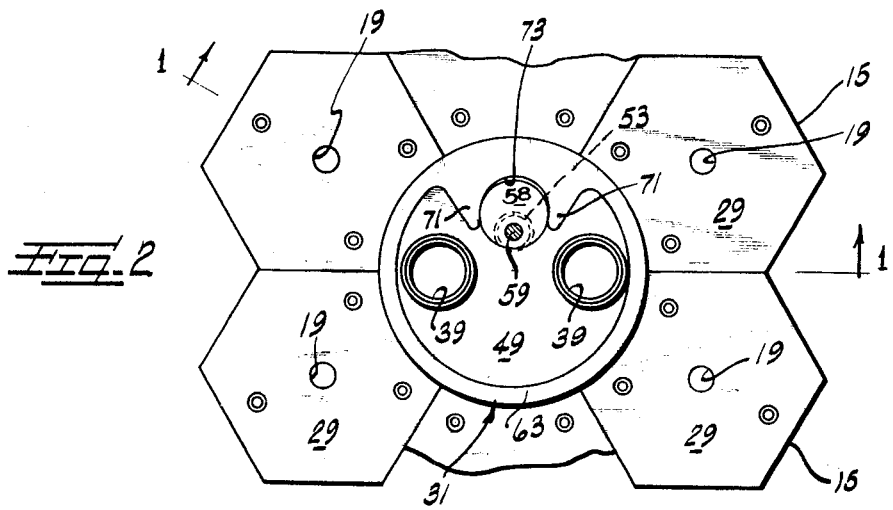
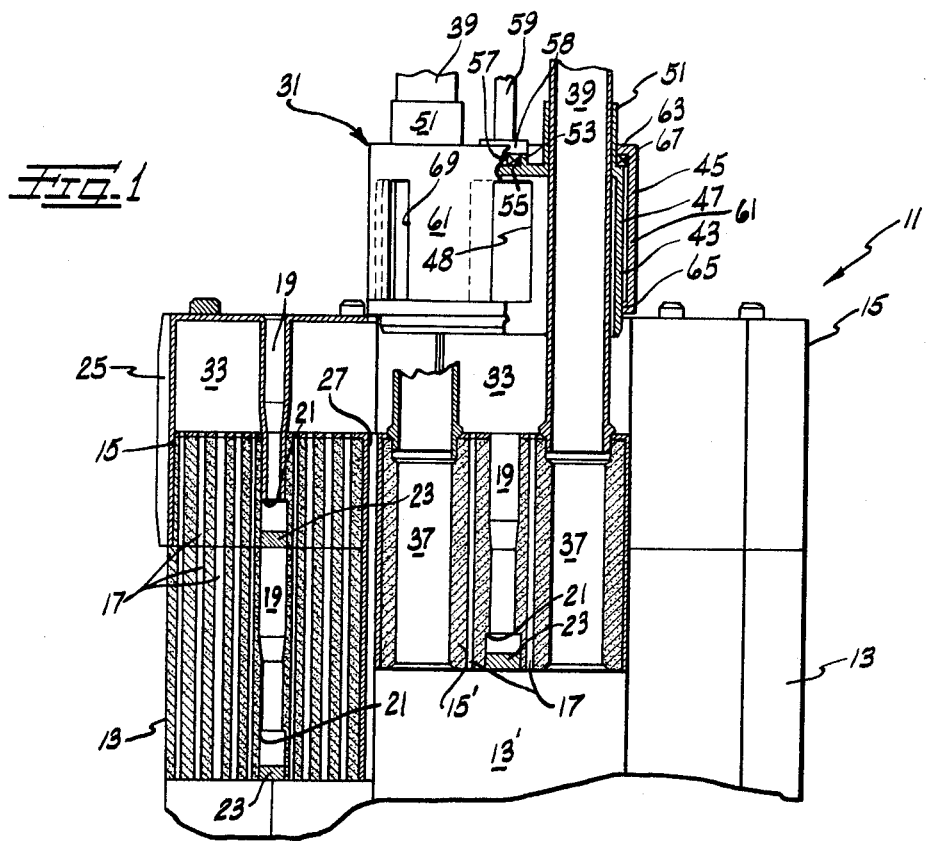
Inventors
KESHAB DUTTA
BASIL C. HAWKE
By Roland A. Anderson
Atty.

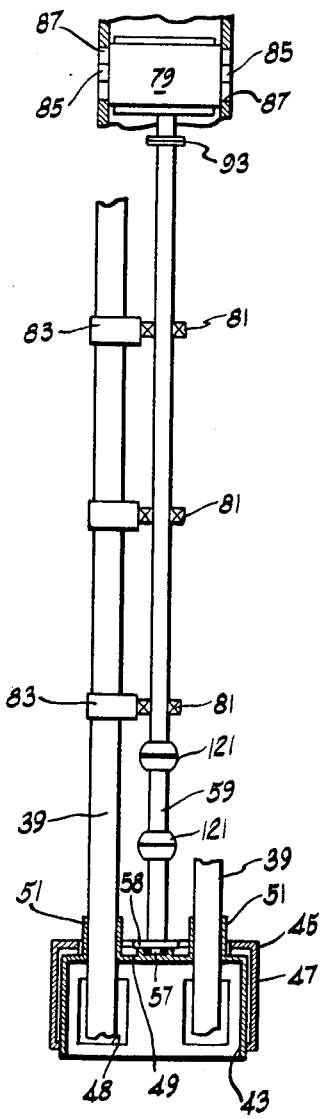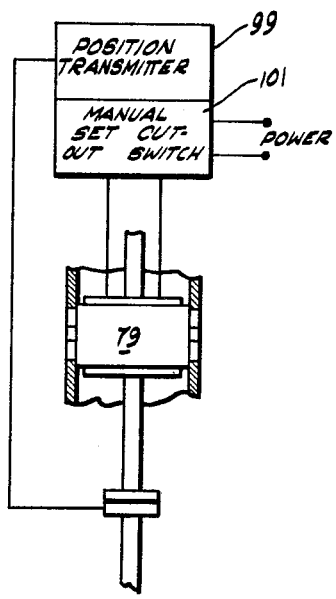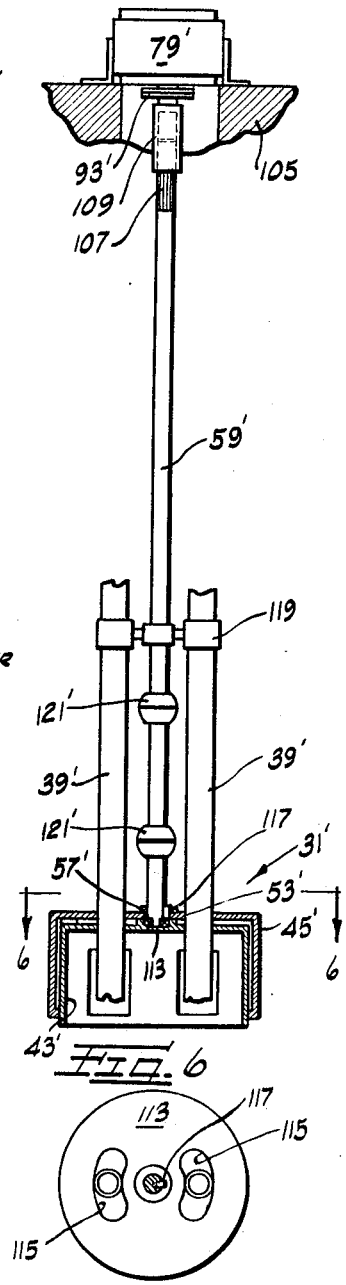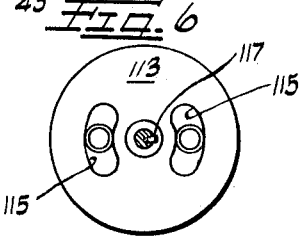

United States Patent Office 3,361,637
Patented Jan. 2, 1968

3,361,637
SHUTTER DEVICE FOR NUCLEAR REACTOR CORE
Keshab Dutta and Basil C. Hawke, San Diego, Calif., assignors to the United States of America as represented by the United States Atomic Energy Commission
Filed Sept. 2, 1966, Ser. No. 577,094
4 Claims. (Cl. 176—59)

ABSTRACT OF THE DISCLOSURE

Apparatus for regulating the amount of flow of a fluid coolant through different regions of a reactor core. The apparatus comprises a shutter device including a pair of elements relatively rotatable and containing openings which can be moved into and out of registration.

---

This invention relates to heterogeneous nuclear reactors which are cooled by a fluid coolant that is circulated therethrough and more particularly to apparatus for regulating the amount of flow of the fluid coolant through different regions of the reactor core.

The effects of fuel age differences in different fuel regions of a reactor core results in different fuel burnup therein. In nuclear reactors utilizing a circulating coolant stream, devices, sometimes called orificing devices, are employed to provide remote control of the fluid coolant flow rate through different regions of the reactor core. In order to maintain the temperature of the coolant as uniform as possible when it exits from the different fuel regions of the core, a greater amount of coolant flow is employed through the regions of higher fuel burnup than is employed through the regions of lower fuel burnup. Improved means for facilitating remote control regulation of different amounts of coolant flow through different core regions in the form of devices of variable opening adapted for disposition between a reactor inlet or outlet plenum chamber section and regions of the reactor core are desired.

It is a principal object of the present invention to provide improved apparatus for regulating the amount of fluid coolant flow through a region of a nuclear reactor core. Another object is to provide apparatus adapted for remote control operation from a location exterior of a nuclear reactor pressure vessel to regulate the area of opening between a coolant plenum chamber at one end of a nuclear reactor core and the respective coolant pathways through the region of the core. It is a further object to provide apparatus for regulating the amount of coolant flow through a particular region of the reactor core which can be adjusted to prevent reduction in amount of coolant flow beyond desired minimum amount. These and other objects of the invention are more particularly set forth in the following detailed description and in the accompanying drawings wherein:

FIGURE 1 is a vertical view partially in section with parts broken away of apparatus embodying various features of the invention;

FIGURE 2 is a plan view of the apparatus shown in FIGURE 1;

FIGURE 3 is a sectional view, reduced in size, showing additional components associated with the apparatus shown in FIGURE 1;

FIGURE 4 is a fragmentary enlarged view showing a portion of FIGURE 3 in more detail;

FIGURE 5 is a sectional view similar to FIGURE 3 of an alternative apparatus embodying various features of the invention; and FIGURE 6 is a sectional view taken generally along line 6—6 of FIGURE 5.

Briefly, the invention provides improved orificing apparatus for use in a nuclear reactor which includes an improved shutter device adapted to be mounted in association with a coolant plenum chamber at one end of the reactor core. The shutter device includes a pair of elements which are relatively rotatable and which contain openings which can be moved into and out of registration with one another as a consequence of relative rotation thereof. The present invention assures precise control of the size of opening between a plenum chamber and a particular region of the reactor core.

The invention is illustrated in connection with a nuclear reactor core 11 employing vertical columns of fuel elements 13 in the form of hexagon-shaped graphite blocks. A nuclear reactor core employing fuel elements of this type is described in detail in U.S. patent application Ser. No. 485,811, filed Sept. 8, 1965. The reactor core 11 employs columns of the fuel elements 13 stacked one atop another with reflector elements 15 as the uppermost members in the columns. Each of the fuel elements 13 and reflector elements 15 is provided with vertically extending coolant passageways 17 which interconnect with one another in the vertical columns so as to provide continuous coolant pathways from the top to the bottom of the reactor core 11.

Each of the reflector elements 15 and the fuel elements 13 has an engagement hole 19 at the center thereof for handling purposes, particularly for removal and replacement thereof in the reactor core 11. A lifting ledge 21, annular in shape, is provided near the lower end of each engagement hole 19 to provide a location for engagement by a pickup head on a fuel element transfer machine (not shown). The bottom of each of the engagement holes 19 is closed with a graphite plug 23 so as to prevent coolant flow therethrough. The reflector elements 15 are provided with keys 25 extending vertically along the side faces thereof at preselected locations. Mating keyways 27 at other locations on the side faces provide means for lateral positioning and interconnection of the reflector elements 15 at the top of the reactor core 11.

As can be best seen in FIGURE 2, the nuclear reactor core 11 is divided into a plurality of core regions each of which includes a group of seven fuel element columns arranged in the pattern illustrated. The reflector elements 15 atop the six columns in the region which constitute the outside of the region are each provided with metal boxes 29 that shroud the periphery of each of the reflector elements on five side faces and on the top. The side face adjacent the central column in the region is left open. A shutter device 31 overlies the central column of each region at a location just above the level of the top walls of the six surrounding metal boxes 29. The open regions in the six metal boxes and the open region within and below the shutter device 31 form a sub-plenum chamber 33 above each reactor core region, the overall vacant region between the top of the core and the overlying portion of the pressure vessel (not shown) into which the coolant stream is directed before it enters the passageways 17 through the core being referred to as the inlet plenum chamber of the reactor.

The fuel elements 13' in the center column of each core region are generally the same as the fuel elements 13 in the surrounding region; they contain nuclear fuel material (not shown) and coolant passageways 17. However, two fairly large holes 37 are provided in the central column fuel elements 13' and in the central reflector element 15' which serve as channels for a pair of control rods (not shown). A pair of control rod guide tubes 39 extend from the top of the control rod holes 37 in the reflector element 15' in the center column upward into a penetration opening through the nuclear reactor pressure vessel wherein control rod drive mechanism (not shown) is disposed during reactor operation.

During refueling of a particular core region of the nuclear reactor, the penetration opening housing the control rod drive mechanism which is vertically above the region serves as a refueling nozzle. To permit removal and replacement of fuel elements 13, the seals for the penetration opening are removed to provide access to the control rod guide mechanism from the top. Withdrawal of the control rod guide mechanism and the control rods vertically upward provides access to the reactor core region. As is hereafter explained in detail, the shutter device 31 is attached to and supported by the pair of control rod guide tubes 39, and it is accordingly removed with the guide tubes when they are withdrawn to facilitate the refueling operation.

The shutter device 31 includes an inner shutter element 43 and an outer shutter element 45. The inner shutter element 43 includes a tubular sheath portion 47 which contains a plurality of spaced apart rectangular openings 48 in the sidewall thereof. A horizontal plate portion 49 surmounts the top of the sheath portion and has formed therein two upstanding tubular sections 51 and an upstanding boss 53 with a cavity 55 formed therein. The inner shutter element is stationarily mounted by passing the two control rod guide tubes through the upstanding tubular sections 51 and suitably securing them thereto, as by welding or the like. The cavity 55 in the boss 53 provides a seat for a bearing 57 which supports the end of a drive shaft 59 extending down from above, and a cam 58 is attached to the shaft 59 immediately above the bearing 57.

The outer shutter element 45 includes an outer tubular sheath 61, proportioned to fit concentrically over and shroud the inner tubular sheath 47, and a generally ring-shaped portion 63 at the top to the tubular sheath. An inturned bottom annular flange 65 rides against the exterior of the inner sheath 47 and, together with a bearing or ball race 67, which is disposed between the top of the inner sheath 47 and the underside of the ring portion 63, assures proper alignment between the two concentric tubular sheaths 47, 61. The outer tubular sheath 61 contains a plurality of spaced apart rectangular openings 69 of substantially the same size as the openings 48 in the stationary inner sheath 41.

In order to rotate the outer sheath 61 relative to the inner sheath 47 and thus move the openings 69 into or out of registration with the openings 48, the ring-shaped portion 63 is formed with a radially inward extending pair of ears 71 which between them define an arcuate guide 73 of slightly longer than semicircular size wherein the circular cam 58 is restrained. As is best seen in FIGURE 2, the circular cam 58 is eccentrically affixed near the end of the drive shaft 59 so that turning of the drive shaft swings the eccentrically mounted circular cam which is held within the restraining arcuate guide 73 causing consequent rotation of the outer shutter element 45 relative to the stationary inner shutter element 43.

When the openings 69 are in registration with the openings 48, it should be clear that the shutter device 31 is in the fully open condition. Of course, the shutter device will seldom be used in this position, for it will normally be in some position of partial registration between the openings 48 and 69. When the tubular sheaths 47 and 61 are moved out of the fully open position, the areas of the sidewall of the sheath 61 between the spaced openings 69 begin to partially cover the openings 48 and thus decrease the total orifice area of the shutter device. Instead of the outer tubular sheath 61, a plurality of separate plates could be employed which could be rotated or slid into covering relationship with the openings 48 in the inner shutter element 43; however, the illustrated arrangement is preferred and gives a device which is structurally stable and capable of precise coolant flow regulation.

The drive shaft 59 extends upwardly from the shutter device 31 through the penetration opening in the pressure vessel (not shown) to an electric motor 79 which is mounted exterior of the pressure vessel. The drive shaft 59 is laterally supported by bearings 81 which are held in suitable brackets 83 attached to one of the control rod guide tubes 39. In the embodiment illustrated in FIGURE 3, the motor 79 is supported via the drive shaft 59 on the shutter device 31 and is restrained from rotational movement while movement in a longitudinal direction is permitted, as for example by mounting via a pair of lugs 85 attached to the motor which slide in a pair of elongated slots 87 provided in a suitable mounting assembly.

A clutch 93 is disposed between the motor 79 and the drive shaft 59 which is designed to permit rotation of the shaft only when the motor 79 is energized to prevent inadvertent rotation which would undesirably change the amount of opening of the shutter device 31. The motor 79 is a stepping motor which is designed to turn the drive shaft via the clutch 93 in steps of about three-tenths of one degree at a time so as to provide for relatively fine adjustment in the total orifice area through the shutter device 31. A position transmitter 99 is connected to the drive shaft 59 and is connected to an indicator remotely located, as on a control panel (not shown), which show the precise amount that the shutter device 31 is open at a given time. As a safety feature, the electrical power to the motor 79 is routed through a cut-out switch 101 which can be manually set as a positive safety feature to maintain a desired minimum orifice area of the shutter device 31. Dependent upon the particular age of the fuel in the core region below the shutter device 31, a minimum value of amount of coolant flow can be calculated below which the flow should not be diminished in order to maintain adequate cooling for safety purposes. By setting the manual switch 101 accordingly, even if some malfunction should occur, the power will be removed from the stepping motor 79 when this minimum orifice area is reached and an alarm is sounded. Removal of the power prevents the shutter device 31 from being further closed because of the design of the clutch 93 which halts motion of the shaft 59 when the motor is deenergized. To accommodate any lateral displacement which might occur between the core of the reactor and the location of which the motor 79 is mounted, two universal joints 121 are provided near the lower end of the drive shaft 59.

An alternative embodiment of the drive means for the shutter device is shown in FIGURES 5 and 6, wherein prime numbers are employed to refer to components common to those of the embodiment shown in FIGURES 1 through 4. The motor 79' is fixedly mounted via mounting means 105 instead of being supported by the drive shaft. To accommodate the thermal expansion and/or contraction which results from the change in temperature and the dimensional changes induced by nuclear irradiation over the life of the nuclear reactor core 11, longitudinal expansion and contraction means is provided as part of the drive shaft 59'. At a location just below the clutch 93', a splined shaft 107 and splined sleeve 109 are provided which rotatably link the portions of the drive shaft 59' but permit lengthening or shortening in the longitudinal direction.

The shutter device 31' is also modified slightly in that the outer shutter element 45' is connected directly to the end of the drive shaft 59'. To facilitate this connection, the outer shutter element 45' includes a full top plate portion 113 which has cut therein a pair of arcuate slots 115 which permit the outer element 45' to rotate without interference with the control rod guide tubes 39'. The lower end of the drive shaft 59' is seated in the bearing 57' disposed in the bore 53' on the top of the inner shutter element 43'. The drive shaft 59' is secured via a key 117 to the plate portion 113.

Alignment of the drive shaft 59' between the motor 79' and the shutter device 31' is provided via one or more guide brackets 119 which are secured to the control guide tubes 39'. To accommodate any lateral displacement which might occur between the core of the reactor and the location at which the motor 79' is fixedly mounted, two universal joints 121' are provided near the lower end of the drive shaft 59' which eliminate any problem of binding when the drive shaft is stepped by the motor 79' to turn the outer shutter element 45' about the stationary inner shutter element 43'.

The invention provides an improved relatively rotatable apparatus for controlling the amount of coolant flow through a section of the reactor core. Although illustrated with respect to controlling the entry of coolant into the top of a gas-cooled reactor core having vertically aligned coolant passageways, it should be realized that it is equally applicable for use with gas or liquid cooled nuclear reactors regardless of the orientation of the coolant passageways and regardless of the direction of the flow. e.g., upward rather than downward through the reactor core. Moreover, it should also be understood that rather than locating the shutter devices between the coolant inlet plenum chamber and the reactor core, the shutter devices may alternatively be located between the reactor core and the exit plenum chamber of the fluid coolant therefrom, although in such an arrangement the temperature environment of the shutter devices would be correspondingly higher.

Various other modifications and changes to the illustrated structure as would be obvious to one skilled in the art may be made without deviation from the spirit and scope of the invention which is defined solely by the claims appended hereto. Various of the features of the invention are set forth in the following claims.

What is claimed is:

1. A nuclear reactor in which the flow of a fluid coolant from an inlet plenum chamber through a region of the core of the reactor and out into an exit plenum chamber is regulated by an apparatus comprising a shutter device disposed in the reactor between a plenum chamber and a region of the reactor core and having an inner shutter element and an outer shutter element which are relatively rotatable, at least one of said elements having openings formed therein and the other element having means for at least partially closing said openings pursuant to relative rotational movement between said elements, and in which a drive shaft is connected to the outer shutter element and to a motor through a clutch, said clutch preventing rotation of said drive shaft in either direction except when said motor is energized.

2. Apparatus in accordance with claim 1 wherein said motor is supported by said drive shaft and adapted to be mounted upon mounting means permitting movement only in a direction axial of said drive shaft.

3. Apparatus in accordance with claim 1 wherein said motor is adapted to be fixedly mounted, wherein said drive shaft includes a connection which permits axial lengthening or shortening and also includes a pair of universal joints to accommodate lateral displacement.

4. Apparatus in accordance with claim 1 wherein a position transmitter is included which monitors the relative rotative orientation of said shutter elements and wherein a switch is connected to said transmitter and to said motor for deenergizing said motor, said switch being adapted to be manually set to various desired values of angular rotation and to deenergize said motor when said set value is reached, whereby decrease of the amount of fluid coolant flow through said core region below a desired minimum amount is prevented.

References Cited
UNITED STATES PATENTS

| | | |
|---|---|---|
| 1,728,015 | 9/1929 | Spoehrer. |
| 2,642,254 | 6/1953 | Armstrong _____ 251—4 |
| 3,053,746 | 9/1962 | Challender et al. ____ 176—61 X |
| 3,296,085 | 1/1967 | Peck et al. _____ 176—61 |

REUBEN EPSTEIN, *Primary Examiner.*